United States Patent
Huang et al.

(10) Patent No.: US 9,035,932 B2
(45) Date of Patent: May 19, 2015

(54) THERMALLY COMPENSATED PIXELS FOR LIQUID CRYSTAL DISPLAYS (LCDS)

(75) Inventors: Yi Huang, Santa Clara, CA (US); Mingxia Gu, Santa Clara, CA (US); Jean-Jacques Philippe Drolet, San Ramon, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 13/601,849

(22) Filed: Aug. 31, 2012

(65) Prior Publication Data

US 2014/0062981 A1 Mar. 6, 2014

(51) Int. Cl.
*G09G 5/00* (2006.01)
*G09G 3/36* (2006.01)
*G02F 1/1333* (2006.01)

(52) U.S. Cl.
CPC ........ *G09G 3/3648* (2013.01); *G02F 1/133382* (2013.01); *G09G 2300/0426* (2013.01); *G09G 2300/043* (2013.01); *G09G 2320/0242* (2013.01); *G09G 2320/041* (2013.01)

(58) Field of Classification Search
CPC ... G09G 5/00; G09G 3/3603; G09G 2320/04; G09G 2320/041
USPC ........... 345/87, 88, 92, 106, 204, 211; 349/33
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,576,555 A * | 11/1996 | Yamanobe et al. | 257/53 |
| 5,825,352 A | 10/1998 | Bisset et al. | |
| 5,835,079 A | 11/1998 | Shieh | |
| 5,854,557 A * | 12/1998 | Tiefnig | 324/700 |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,678,024 B2 | 1/2004 | Kim | |
| 6,690,387 B2 | 2/2004 | Zimmerman et al. | |
| 6,774,963 B1 * | 8/2004 | Nakao et al. | 349/104 |

(Continued)

FOREIGN PATENT DOCUMENTS

| | | |
|---|---|---|
| JP | 2000-163031 A | 6/2000 |
| JP | 2002-342033 A | 11/2002 |
| WO | 2012013291 A1 | 2/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joe H Cheng
(74) *Attorney, Agent, or Firm* — Morrison & Foerster LLP

(57) ABSTRACT

Systems, methods, and devices are provided for an electronic display with thermally compensated pixels. Such an electronic display may have an array of pixels, at least some of which may be thermally compensated pixels that exhibit reduced thermal color shift over an operational temperature range. These thermally compensated pixels may have compensation electrodes that induce an electric field in the thermally compensated pixel that cause a reduction in color shift.

28 Claims, 12 Drawing Sheets

(56) References Cited

U.S. PATENT DOCUMENTS

| | | | |
|---|---|---|---|
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 7,742,127 | B2 | 6/2010 | Kaihoko |
| 7,787,092 | B2 | 8/2010 | Mizusako |
| 8,102,592 | B2 * | 1/2012 | Ji .................................. 359/295 |
| 8,479,122 | B2 | 7/2013 | Hotelling et al. |
| 2006/0197753 | A1 | 9/2006 | Hotelling |
| 2007/0268537 | A1 * | 11/2007 | Holmes ............................. 359/9 |
| 2011/0032435 | A1 | 2/2011 | Kimura |
| 2013/0044120 | A1 * | 2/2013 | Ge et al. ........................ 345/589 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

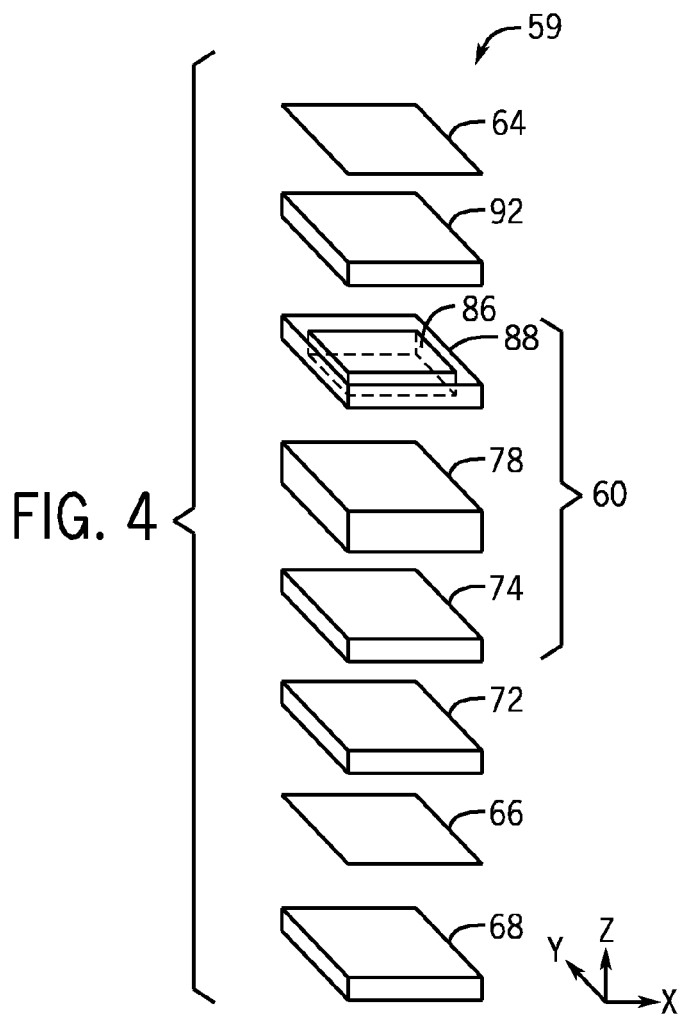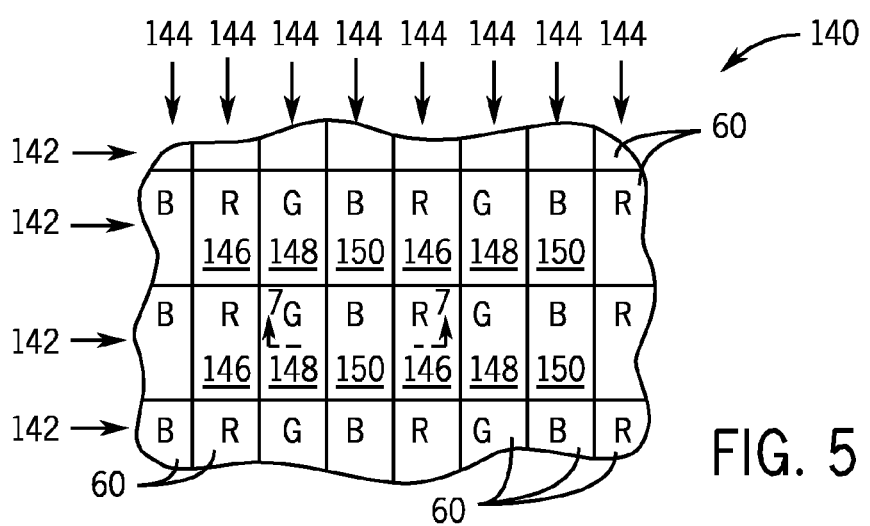

US 9,035,932 B2

THERMALLY COMPENSATED PIXELS FOR LIQUID CRYSTAL DISPLAYS (LCDS)

BACKGROUND

The present disclosure relates generally to liquid crystal displays (LCDs) and, more particularly, to LCDs with thermally compensated pixels to reduce thermal color shift.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Handheld devices, computers, televisions, and numerous other electronic devices often use flat panel displays known as liquid crystal displays (LCDs). LCDs employ a layer of a liquid crystal material that changes orientation to permit varying amounts of light to pass in response to an electric field applied to it. To produce images of a variety of colors, an LCD may employ a variety of colors of picture elements (pixels) of certain discrete colors. For example, many LCDs employ groups of red pixels, green pixels, and blue pixels, which collectively can produce virtually any color. By varying the amount of red, green, and blue light each group of pixels emits, images can be displayed on the LCD.

The various electronic devices that employ LCDs, as well as the environment in which such devices are used, may generate heat, causing the temperature of their respective LCDs to change. As the temperature of an LCD changes, the pixels of the LCD may shift in color. Thus, an image displayed on the LCD when an electronic device is operating at one temperature may look different than the same image displayed on the LCD at a different temperature. Also, because different components of an electronic device may generate heat at different locations behind the LCD, different parts of the LCD may be at very different temperatures than others at any given time. Thus, the same color image data may also look different at different locations of the LCD, potentially distorting the color of the image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to electronic displays having an array of pixels, at least some of which may be thermally compensated pixels that exhibit reduced color shift over an operational temperature range. These thermally compensated pixels may include a common electrode, an insulator, pixel electrodes, a liquid crystal layer, a black mask, a glass substrate, as well as compensation electrodes disposed above the liquid crystal layer. The compensation electrodes may be driven with a voltage to generate an electric field that reduces thermal color shift when the temperature of the electronic display or pixels changes over the operational temperature range.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is a schematic exploded view of a portion of an electronic display, in accordance with an embodiment;

FIG. 5 is a schematic diagram of an array of pixels of an electronic display, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features To reduce the amount of thermal color shift that could occur in a liquid crystal display (LCD) over a range of normal operating temperatures (e.g., 20° C.-50° C.) embodiments of the present disclosure provide various electronic display configurations having thermally compensated pixels. These thermally compensated pixels may exhibit less thermal color shift than conventional LCD pixels by having additional electrodes disposed above a liquid crystal layer. The present disclosure will describe in further detail the general configuration of such thermally compensated pixels and several exemplary embodiments of thermally compensated pixels having the disclosed techniques.

Figure 1:
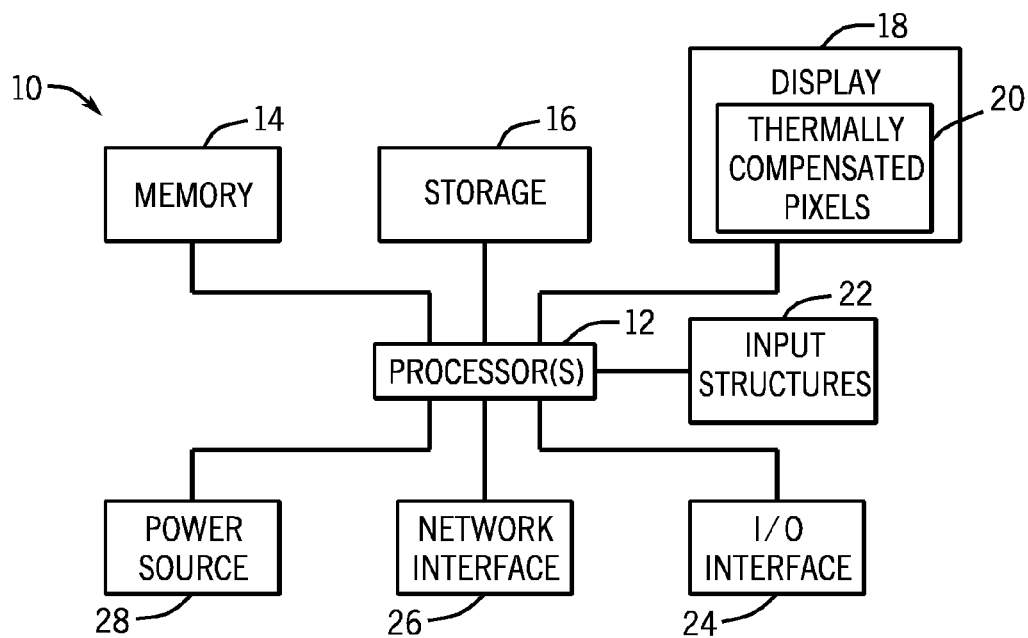
FIG. 1 is a block diagram of an electronic device that employs a display with thermally compensated pixels, in accordance with an embodiment.
Figure 2:
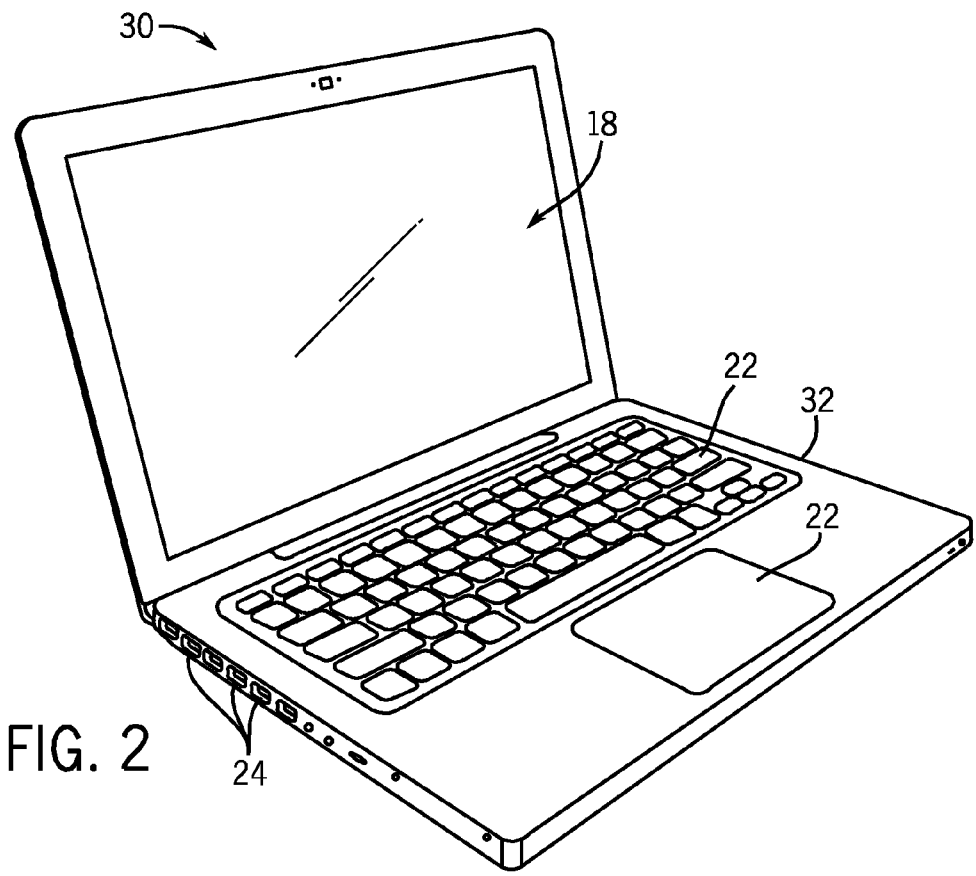
FIG. 2 is a perspective view of an embodiment of the electronic device of FIG. 1 in the form of a notebook computer, in accordance with an embodiment.
Figure 3:
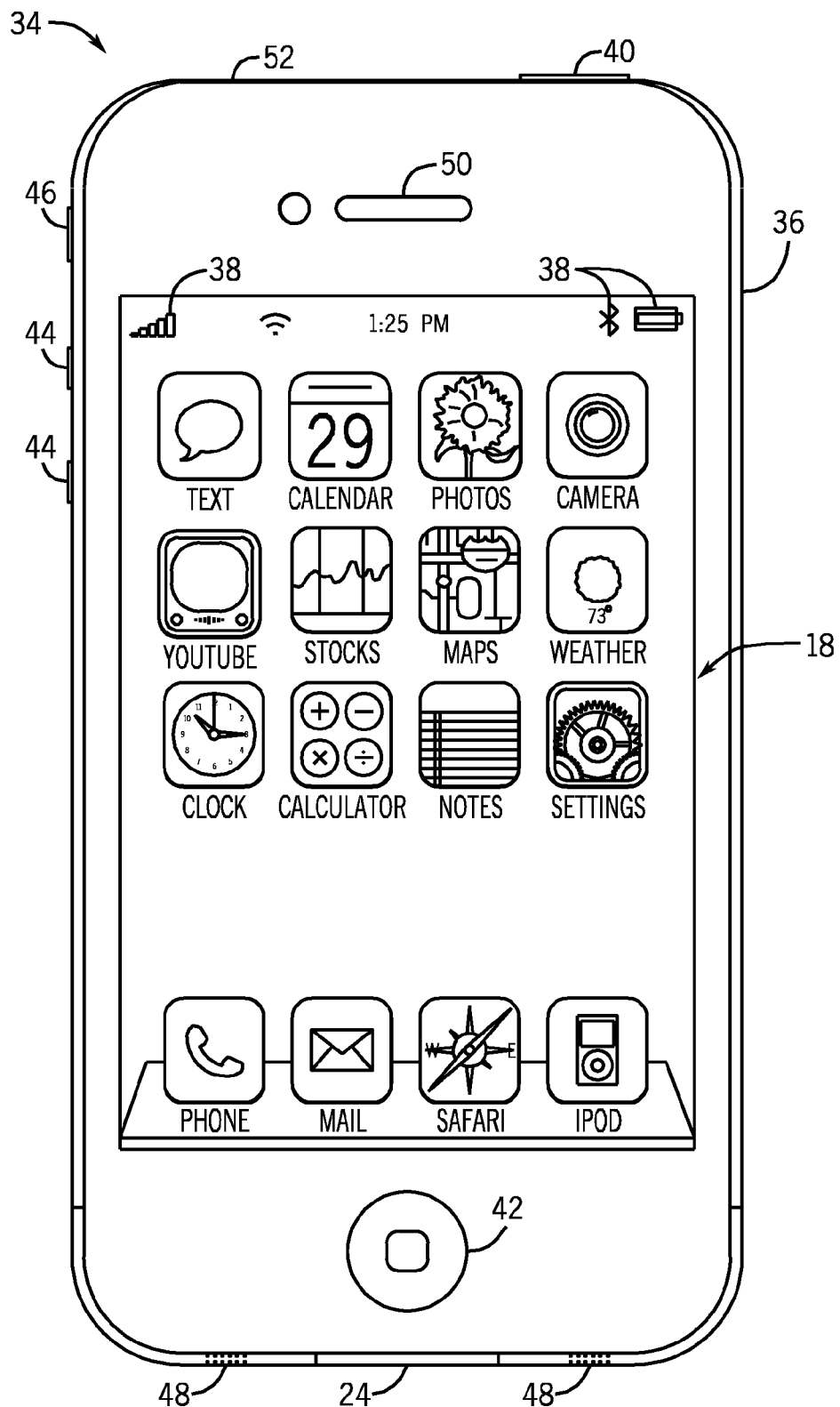
FIG. 3 is a front view of an embodiment of the electronic device of FIG. 1 in the form of a handheld device, in accordance with an embodiment.

With the foregoing in mind, a general description of suitable electronic devices that may employ electronic displays having thermally compensated pixels with reduced thermal color shift will be provided below. In particular, FIG. 1 is a block diagram depicting various components that may be present in an electronic device suitable for use with such a display. FIGS. 2 and 3 respectively illustrate perspective and front views of suitable electronic device, which may be, as illustrated, a notebook computer or a handheld electronic device. In certain embodiments, suitable electronic devices may include a desktop computer, tablet computer, display screen, and the like.

Turning first to FIG. 1, an electronic device 10 according to an embodiment of the present disclosure may include, among other things, one or more processor(s) 12, memory 14, nonvolatile storage 16, a display 18 having thermally compensated pixels 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to execute instructions to carry out, among other things, certain techniques disclosed herein. These programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD), for example, which may enable users to interact with a user interface of the electronic device 10. In some embodiments, the display 18 may be a MultiTouch™ display that can detect multiple touches at once. The display 18 may be capable of operating over a range of temperatures with relatively little thermal color shift, due in part to the thermally compensated pixels 20. For example, the thermally compensated pixels 20 may have such little thermal color shift such that a white screen does not incur a significant tinge of any color as temperature varies in an operational range. Thus, despite variations in temperature of the display 18 over time or at different locations of the display 18, the colors produced by the display 18 may remain relatively constant.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on display 18.

The display 18 of the computer 30 may be relatively hotter in some locations than others. Indeed, parts of the display 18 nearer to the data processing circuitry of the computer 30 may at times be, for example, approximately 10° C.-20° C. warmer than those parts of the display 18 furthest from the data processing circuitry of the computer 30. Despite these temperature variations, the thermally compensated pixels 20 may reduce the amount of color shift that would otherwise occur due to such temperature variations.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, California. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Like the display 18 of the computer 30, various locations of the display 18 of the handheld device 34 also may be relatively hotter than others. For example, certain components of the handheld device 34 may be arranged beneath the display 18, generating discrete locations of heat. Thus, some parts of the display 18 may reach, for example, 20° C. warmer than parts of the display 18 not set out before heat-generating components. Despite these temperature variations, the thermally compensated pixels 20 may reduce the amount of color shift that would otherwise occur due to the temperature variations.

As noted above, the display 18 may include an array or matrix of picture elements (pixels). By varying an electric field associated with each pixel, the display 18 may control the orientation of liquid crystal disposed at each pixel. The orientation of the liquid crystal of each pixel may permit more or less light to pass through each pixel. The display 18 may employ any suitable technique to manipulate these electrical fields and/or the liquid crystals. For example, the display 18 may employ transverse electric field modes in which the liquid crystals are oriented by applying an in-plane electrical field to a layer of the liquid crystals. Examples of such techniques include in-plane switching (IPS) and/or fringe field switching (FFS) techniques.

By controlling of the orientation of the liquid crystals, the amount of light through the pixels may change. Changing the amount of light through the pixels will change the colors perceived by a user of the display 18. Specifically, a group of pixels may include a red pixel, a green pixel, and a blue pixel, each having a color filter of that color. By varying the orientation of the liquid crystals associated with different colored pixels, a variety of different colors may be perceived by a user viewing the display. It may be noted that the individual colored pixels of a group of pixels may also be referred to as unit pixels.

With the foregoing in mind, FIG. 4 depicts an exploded view of different layers of a display region 59 of the display 18, in which the display region 59 corresponds to a pixel 60. The display region 59 includes an upper polarizing layer 64 and a lower polarizing layer 66 that polarize light emitted by a backlight assembly 68 or light-reflective surface. A lower substrate 72 may be disposed above the polarizing layer 66 and is generally formed from a light-transparent material, such as glass, quartz, and/or plastic.

A thin film transistor (TFT) layer 74 may be disposed above the lower substrate 72. For simplicity, the TFT layer 74 is depicted as a generalized structure in FIG. 4. In practice, the TFT layer may itself comprise various conductive, non-conductive, and semiconductive layers and structures that generally form the electrical devices and pathways that drive the operation of the display 18. For example, when the display 18 is part of an FFS LCD panel, the TFT layer 74 may include the respective data lines, scanning or gate lines, pixel electrodes, and common electrodes (as further described in FIG. 5). In light-transmissive portions of the display 18, these conductive structures may be formed using transparent conductive materials such as indium tin oxide (ITO). In addition, the TFT layer 74 may include insulating layers (such as a gate insulating film) formed from suitable transparent materials (such as silicon nitride, and the like) and semiconductive layers formed from suitable semiconductor materials (such as amorphous silicon, IGZO, and the like). The TFT layer 74 may also include an alignment layer (formed from polyimide or other suitable materials) at the interface with a liquid crystal layer 78.

The liquid crystal layer 78 includes liquid crystal molecules suspended in a fluid or gel matrix. The liquid crystal molecules may be oriented or aligned with respect to an electrical field generated by the TFT layer 74. The orientation of the liquid crystal molecules in the liquid crystal layer 78 determines the amount of light transmission through the display region 59. Thus, by modulation of the electrical field applied to the liquid crystal layer 78, the amount of light transmitted though the display region 59 may be correspondingly modulated.

Disposed on the other side of the liquid crystal layer 78 from the TFT layer 74 may be an overlying color filter 86. The color filter 86 may be a red, green, or blue filter, for example. Thus, each display region 59 may correspond to a primary color when light is transmitted from the backlight assembly 68 through the liquid crystal layer 78 and the color filter 86.

The color filter 86 may be surrounded by a light-opaque mask or matrix, represented here as a black mask 88. The black mask 88 circumscribes the light-transmissive portion of the display region 59, delineating the pixel edges. The black mask 88 may be sized and shaped to define a light-transmissive aperture over the liquid crystal layer 78 and around the color filter 86. In addition, the black mask 88 may cover or mask portions of the display region 59 that do not transmit light, such as the scanning line and data line driving circuitry, the TFT, and the periphery of the display region 59. In the example of FIG. 4, an upper substrate 92 may be disposed between the black mask 88 and color filter 86 and the polarizing layer 64. The upper substrate 92 may be formed from light-transmissive glass, quartz, and/or plastic. The display region 59 described above generally includes the pixel 60, which may include the TFT layer 74, the liquid crystal layer 78, the color filter 86 and the black mask 88.

As depicted in FIG. 5, an LCD pixel array 140 may include a plurality of pixels 60 arranged in rows 142 and columns 144. In the presently illustrated embodiment, the array 140 includes alternating columns of red pixels 60R, green pixels 60G, and blue pixels 60B. It is noted, however, that these various colored pixels may be provided in other arrangements, such as those in which the order of columns associated with respective colors is different, or in which the columns include pixels 60 of different colors. Additionally, the pixels 60 may include other colors in addition to, or in place of, those noted above. Generally, the red pixels 60R, green pixels 60G, and blue pixels 60B may be used in combination to display virtually any color. Such colors may be display by varying how much red, green, and blue light is emitted from the respective pixels 60. The amount of light emitted through these pixels 60 may be called transmittance. Thus, by controlling the transmittances of the red pixel 60R, the green pixel 60G, and the blue pixel 60B, virtually any color may be displayed.

Figure 6:
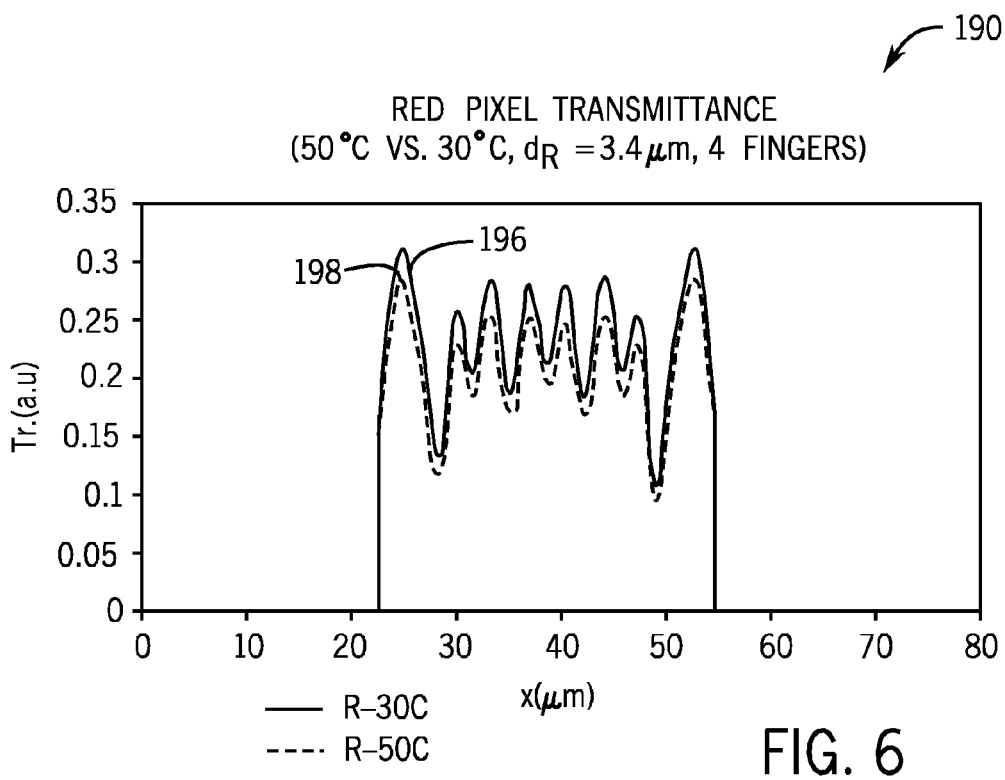
FIGS. 6-8 are plots illustrating changes in transmittance for red, green, and blue pixels, respectively, over a temperature range, in accordance with embodiments.
Figure 7:
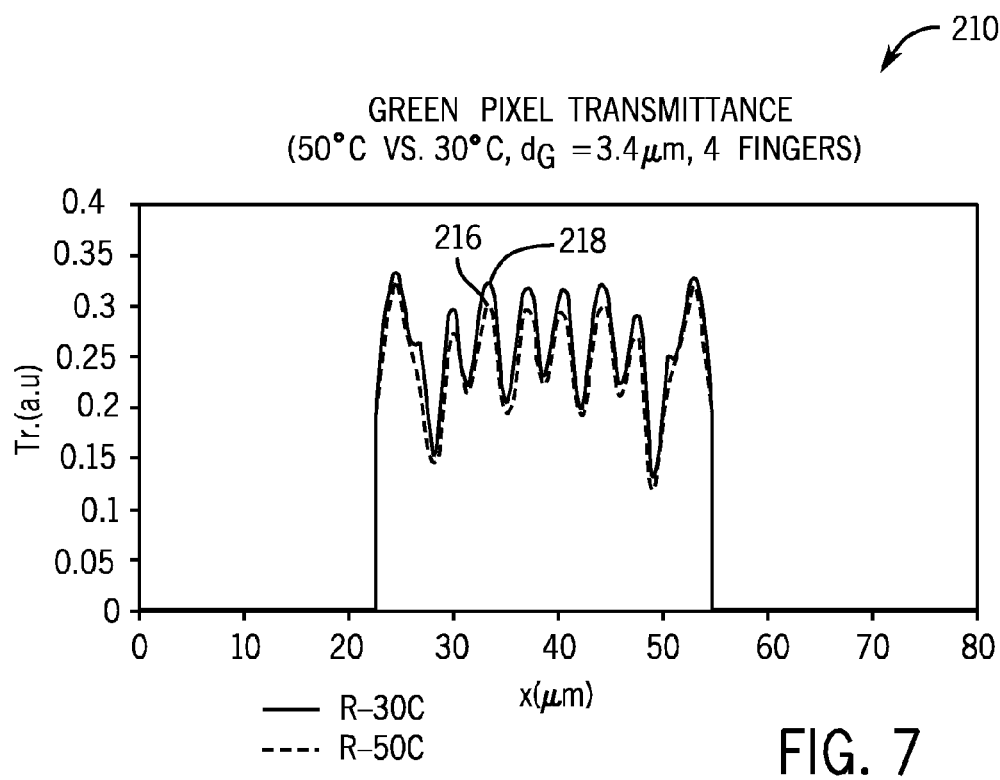
Figure 8:
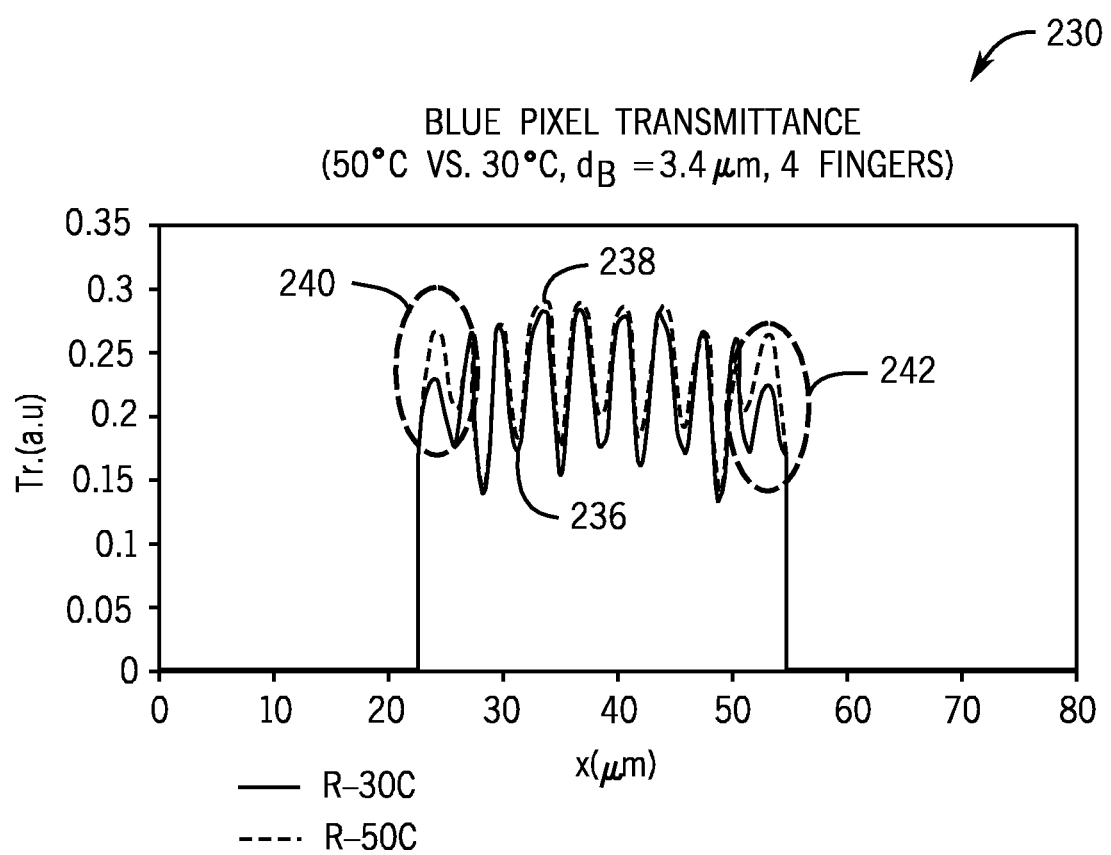

However, pixels 60 may exhibit changes in transmittance as temperature varies that result in thermal color shift, in which the transmittance of the red pixel 60R, the green pixel 60G, and the blue pixel 60B change differently. FIGS. 6-8 illustrate such changes in transmittance for red, green, and blue pixels, respectively. It should be noted that the pixels of FIGS. 6-8 are conventional LCD pixels, and not thermally compensated pixels. As shown by a plot 190 of FIG. 6, the transmittance of a red pixel 60R may uniformly decrease between an operating temperature of 30° C. to 50° C. In the plot 190, a y-axis represents transmittance in absorbance units (a.u.) from 0 to 0.35. A x-axis represents a simulated distance in units of micrometers (μm) across the red pixel 60R. In the plot 190 of FIG. 6, a curve 196 represents the transmittance of the red pixel 60R modeled at a temperature of 30° C. A curve 198 represents the transmittance of the red pixel 60R modeled at 50° C. As can be seen, the transmittance of the red pixel 60R appears to decrease slightly across its entire length.

Turning to FIG. 7, a plot 210 having the same transmittance vs. distance axes as FIG. 6 models the transmittance of the green pixel 60G between an operating temperature of 30° C. and 50° C. The green pixel 60G modeled in the plot 210 of FIG. 7 is understood to delineate the pixel edges from approximately 23 μm to approximately 55 μm. A curve 216 represents the transmittance of the green pixel 60G at approximately 30° C. A curve 218 represents the transmittance of the green pixel 60G at approximately 50° C. Thus, as seen in the plot 210, the transmittance of the green pixel 60G may decrease slightly across approximately the middle two-thirds of the green pixel 60G.

Finally, a plot 230 of FIG. 8 models the transmittance between an operating temperature of 30° C. and 50° C. of the blue pixel 60B. Unlike the transmittances of the red pixel 60R and green pixel 60G, modeled in FIGS. 6 and 7, respectively, the plot 230 of FIG. 8 illustrates that changes in the transmittance of the blue pixel 60B over changes in temperature are very different at the edges of the blue pixel 60B from other parts of the blue pixel 60B. Additionally, rather than exhibiting a slight decrease in transmittance, like the red pixel 60R and the green pixel 60G, the blue pixel 60B exhibits a significant increase in transmittance at the edges. This causes an increase in transmittance of the blue pixel 60B.

In the plot 230 of FIG. 8, a curve 236 illustrates transmittance at 30° C. and curve 238 represents transmittance at 50° C. The curves 236 and 238 appear to largely overlap in the middle three-fifths of the blue pixel 60B. However, along the outer edges 240 and 242, at approximately the outer one-fifth of each side of the blue pixel 60B, the transmittance can be seen to increase substantially from an operating temperature of 30° C. to 50° C. As such, the change in transmittance in the outer edges 240 and 242 of the blue pixel 60B may significantly impact the thermal color shift of the overall array of pixels. The boundary liquid crystal (BLC) material of the liquid crystal layer 78 may be affected by over-phase retardation for blue light, resulting in an increase in transmittance of the edges of the blue pixel 60B relative to temperature, while the transmittance of green and red light decrease with increasing temperature. As such, the overall LCD display may exhibit a blue color shift as temperature rises.

As seen in FIGS. 6-8, as temperature increases, the transmittance of the red pixel 60R and the green pixel 60G decrease while the transmittance of the blue pixel 60B increases. As such, less red and green color is emitted, and more blue color is emitted. This may cause a thermal color shift towards blue. Thus, in certain embodiments, the blue pixel 60B may include compensation electrodes 130 (FIG. 11) configured to correct for the increase in transmittance of the blue pixel 60B at higher temperatures such that thermal color shift may be reduced.

Thermal color shift is believed to arise when the temperature of the pixels 60 increases, and the transmittance of the red pixel 60R and green pixel 60G decreases while the transmittance of the blue pixel 60B increases. Thus, the display 18 may exhibit a blue tinge. Moreover, it is believed that light phase retardation and the liquid crystal profile (first order) is the root cause of this thermal color shift. Specifically, pixels of a certain color, such as blue, may exhibit over phase effect at the boundary, in which light transmittance becomes greater at the edges of the pixel than the rest of the pixel area as temperature rises. The boundary phase retardation effect may be caused by a horizontal electric field generated between two adjacent pixels of opposite polarity. As such, the orientation of the liquid crystal material at the pixel edges may let a greater amount of light pass through at high temperature, resulting in higher transmittance at the pixel edges of, blue pixels 60B, for example. As such, the display may exhibit thermal color shift.

Figure 9:
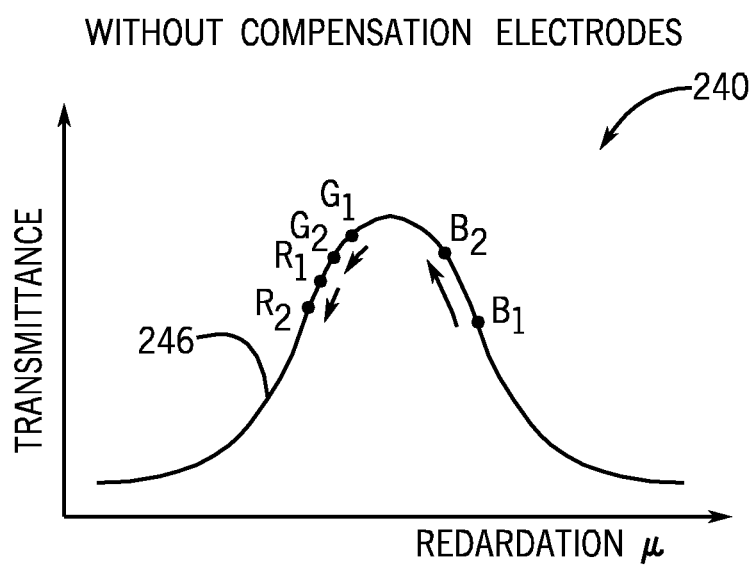
FIG. 9 is a plot illustrating characteristics of a conventional LCD pixel, in accordance with embodiments.

Turning now to FIG. 9, a plot 240 models the transmittance of conventional red, green, and blue pixels 60R, 60G, and 60B, respectively, in which there are no compensation electrodes. The plot 240 includes an ordinate having a transmittance axis as the y-axis and a retardation axis as the x-axis. The transmittance axis defines the transmittance level of a pixel, and the retardation axis represents the phase retardation $d\Delta n_{eff}\lambda$ (liquid crystal effective birefringence ($\Delta n_{eff}$) times a cell gap depth (d) divided by the wavelength of light ($\lambda$)). A curve 246 defines the relationship between the transmittance and phase retardation. In the plot 240, $R_1$ represents a general transmittance level of the red pixel 60R at a first temperature ($T_1$), and $G_1$ represents a general transmittance level of the green pixel 60G at $T_1$. Likewise, $B_1$ represents the transmittance level of the blue pixel 60B at $T_1$. $T_1$ may be close to room temperature or the base operational temperature of the pixel, such as approximately 30° C. $R_2$ represents a general transmittance level of the red pixel 60R at a second temperature ($T_2$), and $G_2$ represents a general transmittance level of the green pixel 250 at $T_2$. $B_2$ represents the transmittance level of the blue pixel 60B at $T_2$, which may be an operational temperature higher than room temperature or the base operational temperature, such as approximately 50 ° C. It can be seen that the transmittance of the blue pixel at $T_2$ is higher than the transmittance of the blue pixel at $T_1$. This increase in transmittance in the blue pixel 60B may cause thermal color shift as the operational temperature of the display increases. Further, as illustrated by the plot 240, the transmittance of the red pixel 60R and the green pixel 60G decrease as temperature increases while the transmittance of the blue pixel 60B increases. This may result in less red and green color being display and more blue color being display. Thus, at $T_2$, the display appears bluer. It should be noted that the transmittance levels characterized in the plot 240 of FIG. 9 represents a base transmittance level of the pixels, in which the pixel electrodes 1 10 are not driven with particular display data.

As illustrated by plot 240, the transmittance of the blue pixel 60B generally increases as temperature increases. This may cause the display 18 to exhibit a blue tinge as temperature increases, which affects perceived display quality and picture integrity. As the normal operating conditions of the display 18 and the pixels 60 may range in temperature, for example, from approximately 30° C. to approximate 60° C., the display 18 may experience color shift during normal operation. As such, a thermally compensated pixel may reduce such color shift in the display 18.

Figure 10:
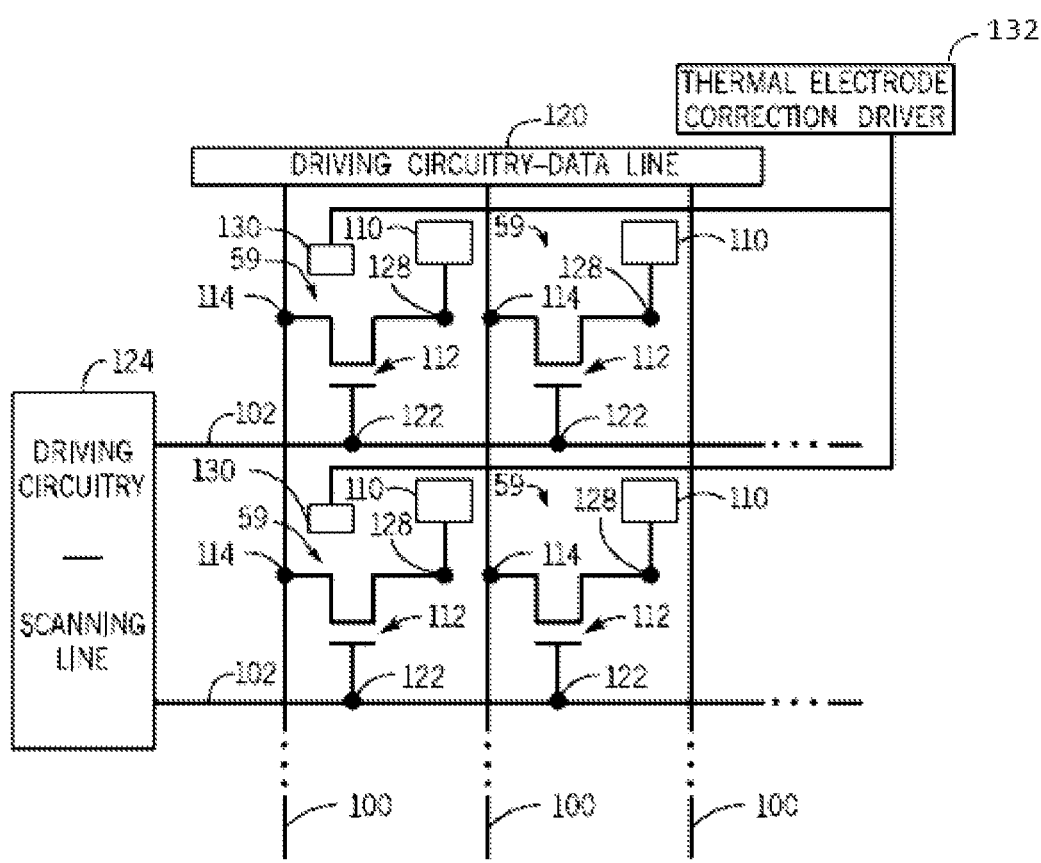
FIG. 10 is a circuit diagram representing circuitry that may be found in an electronic display, in accordance with an embodiment.

A circuit view of driving circuitry found in the display 18 appears in FIG. 10. The circuitry of FIG. 10 may be embodied, for example, in the TFT layer 74 described with respect to FIG. 4. In the example of FIG. 10, the display regions 59 may be disposed in a matrix that forms an image display are of a display 18. In this matrix, each display region 59 may be defined by the intersection of data lines 100 and scanning or gate lines 102. Each pixel 60 includes a pixel electrode 110 and thin film transistor (TFT) 112 for switching the pixel electrode 110. The source 114 of each TFT 112 may be electrically connected to a data line 100, extending from respective data line driving circuitry 120. Similarly, the gate 122 of each TFT 112 may be electrically connected to a scanning or gate line 102, extending from respective scanning line driving circuitry 124. In the example of FIG. 10, the pixel electrode is electrically connected to a drain 128 of the respective TFT 112.

In one embodiment, the data line driving circuitry 120 sends image signals to the pixel electrode 110 via the respective data lines 100. Such image signals may be applied by line sequence (i.e., the data lines 100 may be sequentially activated during operation). The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element that can be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

Figure 11:
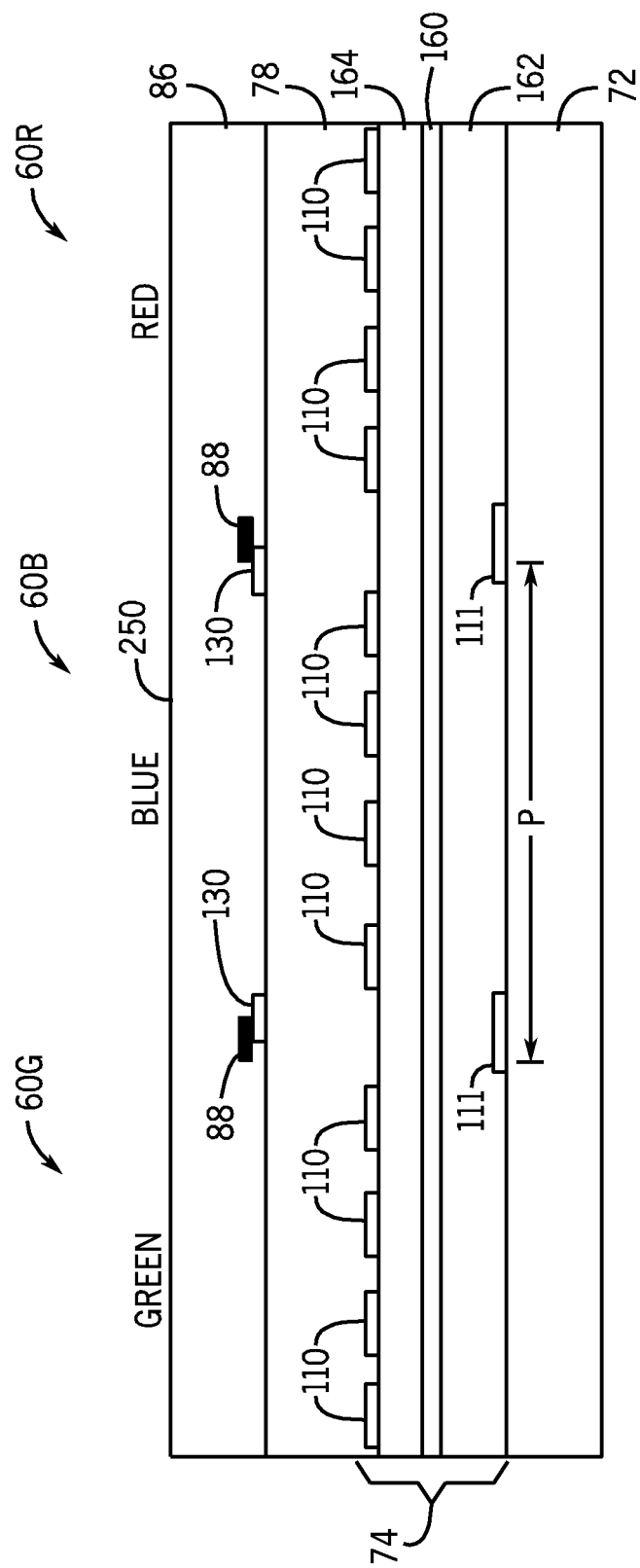
FIG. 11 is a schematic cross-sectional view of three pixels of an electronic display (applicable to both pixel electrode on top or common electrode on top driving schemes), one of which is a thermally compensated pixel, in accordance with an embodiment.

The image signals stored at the pixel electrode 110 may be used to generate an electrical field between the respective pixel electrode 110 and a common electrode 111 (shown in FIG. 11). The electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode 111 to prevent leakage of the stored image signal at the pixel electrode 110. For example, the storage capacitor may be provided between the drain 128 of the respective TFT 112 and a separate capacitor line.

In certain embodiments, thermally compensated pixels include one or more compensation electrodes 130. Each compensation electrode 130 may be coupled to a common voltage or a voltage driven thermal electrode correction driver 132. The compensation electrode 130, upon receiving a voltage signal, may induce an electrical field between the respective compensation electrode 130 and the common electrode 111. The electrical field formed between the compensation electrode 130 and the common electrode 111 may further orient liquid crystals within the liquid crystal layer 78 (FIG. 4) to modulate light transmission through the liquid crystal layer 78. As such, the light transmission (e.g., transmittance) may be controlled to compensate for the effects of thermal color shift.

In certain embodiments, thermally compensated pixels may include blue pixels 60B, as the transmittance of blue pixels may be especially affected by temperature change. Specifically, as described in detailed below, blue pixels may have the tendency to increase in transmittance at higher temperatures relative to the other colors, resulting in a color shift towards blue. Accordingly, blue pixels 60B may include compensation electrodes 130 in certain embodiments. Accordingly, the compensation electrodes 130 are distributed in configurations that reduce thermal color shift over, for example, a 20° C. range of normal operating temperatures.

An exemplary configuration of a thermally compensated pixel is represented in FIG. 11, which illustrates a cross-sectional view of a red pixel 60R, a green pixel 60G, and a blue pixel 60B, in which the blue pixel 60B is a thermally compensated pixel and thus includes compensation electrodes 130. Specifically, these pixels 60R, 60G, and 60B are disposed over the lower substrate layer 72. Data lines 100 may be formed over the lower substrate layer 72 in the TFT layer 74. The TFT layer 74 may include a common electrode 160 disposed over a dielectric layer 162, which may serve as a dielectric between data lines 100 and thin film transistors (TFTs) 112 (not seen in FIG. 11) and a corresponding common electrode 160. A passivation layer 164 may be disposed above the common electrode 160. The pixel electrodes 110 of the red pixel 60R, the green pixel 60G, and the blue pixel 60B may be formed directly on top of the passivation layer 164.

Above the TFT layer 74 is disposed the liquid crystal layer 78. The liquid crystal layer 78 may include a fluid or gel containing liquid crystal molecules that vary in alignment responsive to an electric field. The liquid crystal material may be selected from materials having a positive or a negative dielectric anisotropy. The liquid crystal material may have birefringence characteristics. These characteristics may impact the manner in which different wavelengths of light are transmitted through the liquid crystal layer 78. In some embodiments, the optical birefringence (Δn) of the liquid crystal layer 78 may be approximately 0.105 at 589 nm, and the typical Δn of the liquid crystals can range from 0.08 to 0.12 at 589 nm. In some embodiments, the optical birefringence of the liquid crystal layer may be higher or lower than the above approximation. In general, the phase retardation dΔn (liquid crystal birefringence (Δn) times a cell gap depth (d)) may be set to be from 320 nm to 350 nm for the green wavelength at 550 nm, to optimize the transmission of green light. However, for the blue wavelength (450 nm), the phase retardation is at the over-phase region. It should be appreciated that other suitable birefringence characteristics may be employed, and that the birefringence indicated here represents only one example that may be used.

As noted, orientation of the liquid crystal molecules of the liquid crystal layer 78 may vary based on an electric field passing through the liquid crystal layer 78 due to a voltage difference between the pixel electrodes 110 and the common electrode 160. The change in orientation of the liquid crystal molecules of the liquid crystal layer 78 ultimately affects the light passing through the liquid crystal layer 78 (e.g., by altering the polarization of the light) and ultimately causes the transmittance of the light to vary based on the voltage difference between the pixel electrodes 110 and the common electrode 160. Light passing through the liquid crystal layer 78 passes through a red color filter in the color filter layer 86 of the red pixel 60R, a green color filter in the color filter layer 86 of the green pixel 60G, and a blue color filter in the color filter layer 86 of the blue pixel 60B. By way of example, the color filters of the color filter layer 86 may permit wavelengths of light of approximately 650 nm, 550 nm, and 450 nm, respectively. It should be noted that filters that permit other suitable wavelengths of light alternatively may be employed.

The black mask 88 may be formed above the color filter layer 86 and may delineate the edges of individual pixels 60. For example, as shown in FIG. 11, the black mask 88 separates the righthand edge of the green pixel 60G from the lefthand edge of the blue pixel 60B. Likewise, the black mask 88 separates the righthand edge of the blue pixel 60B from the lefthand edge of the red pixel 60R.

Figure 12:
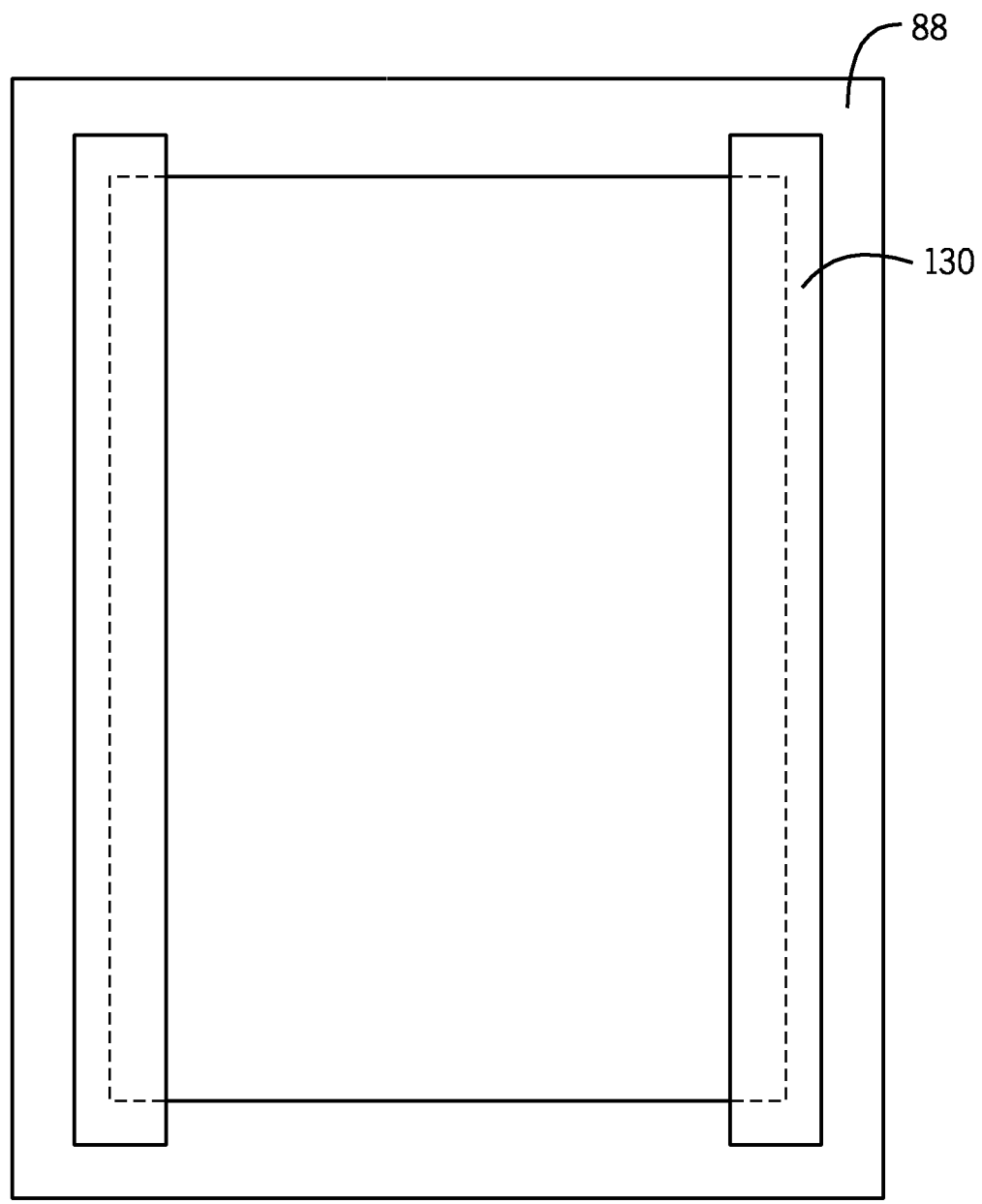
FIG. 12 is a top view of a thermally compensated pixel of an electronic display, in accordance with an embodiment.

The structure of the thermally compensated pixel 250 is illustrated in FIG. 11 as the blue pixel 60B. As shown, a pair of compensation electrodes 130 is disposed beneath the black mask 88 near opposing edges of the blue pixel 60B. This configuration allows a vertical electric field to be generated between the compensation electrodes 130 and the pixel electrodes 110, which orients the liquid crystal material in the liquid crystal layer 78 to reduce blue color shift. The compensation electrodes 130 may be made of indium tin oxide or other suitable material for forming electrodes. For additional reference, a top view of the black mask 88 and the compensation electrodes 130 of the thermally compensated pixel illustrated in FIG. 12. As shown, the compensation electrodes 130 may be partially beneath the black mask 88 and partially exposed.

The overall color shift is generally caused by the over-phase retardation of liquid crystal material for blue light. The in-plane transverse field at the blue pixel edge induced by the opposite polarity of the adjacent pixels further exaggerates the over-phase retardation at the boundary. The compensation electrode 130 may be driven to generate a vertical electric field at the edges of the pixel such that the liquid crystal director molecules may be tilted, and the phase retardation decreases at room temperature. Thus, the overall transmittance of the blue pixel follows the curve of FIG. 9 and increase to be closer to its maximum transmittance at room temperature. As temperature increases, the increase in transmittance is reduced. Thus, the blue shift in color may be generally mitigated.

Voltage may be provided to the compensation electrodes in several ways for correcting thermal color shift. For example, in certain embodiments, the compensation electrodes may be driven at a constant voltage any time the display is powered on. In some embodiments, the compensation electrodes may be driven at a constant voltage only when the pixel is under a certain temperature threshold. Additionally, the compensation electrodes may also be driven at a variable voltage, in which the driving voltage is inversely related to the temperature of the pixel. FIGS. 13A-15B illustrate certain behavior of the thermally compensated pixel with compensation electrodes under the three exemplary driving schemes noted above.

Figure 13A:
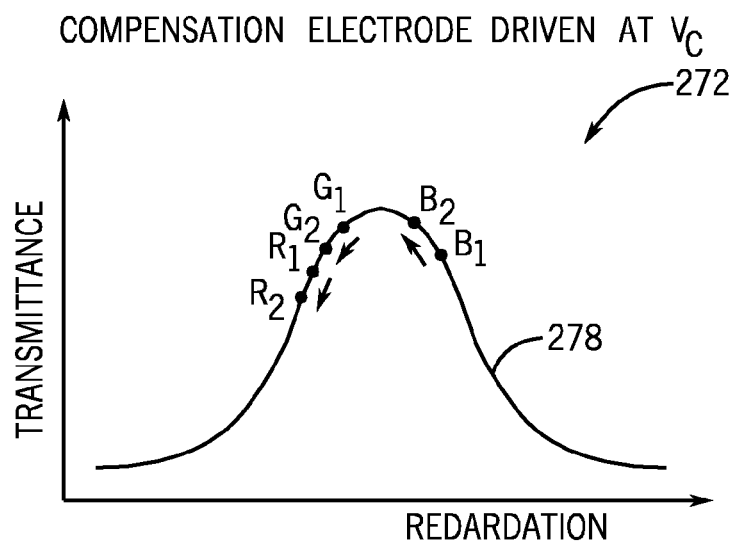
FIGS. 13A and 13B are plots illustrating characteristics of a thermally compensated pixel driven at a constant voltage, in accordance with embodiments.
Figure 13B:
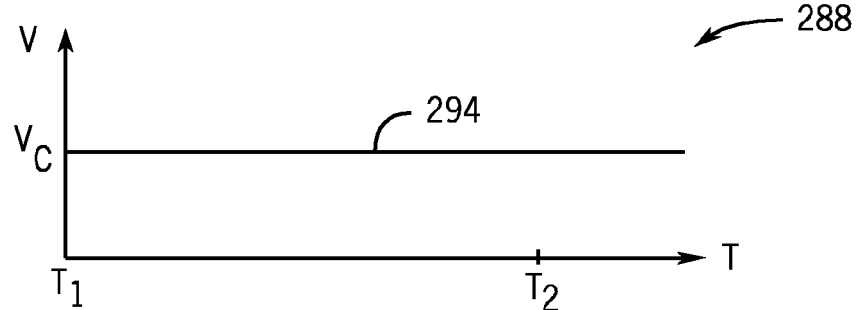

FIGS. 13A-13B illustrate certain behaviors of thermally compensated pixels when the compensation electrodes are driven at a constant voltage whenever the display is on. Specifically, in FIG. 13A, a plot 272 models the transmittance of conventional red, green, and blue LCD pixels, in which the blue pixel 60B is a thermally compensated pixel 250. The plot 272 includes an ordinate having a transmittance axis and a retardation axis as the y and x axes, respectively. A curve 278 defines the relationship between the transmittance and phase retardation. In the plot, $R_1$ represents a general transmittance level of the red pixel 60R at a first temperature ($T_1$), and $G_1$ represents a general transmittance level of the green pixel 60G at $T_1$. Likewise, $B_1$ represents the transmittance level of the blue pixel 60B at $T_1$. $T_1$ may be close to room temperature or the base operational temperature of the pixel, such as approximately 30° C. $R_2$ represents a general transmittance level of the red pixel 60R at a second temperature ($T_2$), and $G_2$ represents a general transmittance level of the green pixel 250 at $T_2$. $B_2$ represents the transmittance level of the blue pixel 60B at $T_2$, which may be an operational temperature higher than room temperature or the base operational temperature, such as approximately 50° C. It can be seen from the plot 272 that while the transmittance of the red and green pixel decrease, the transmittance of the blue pixel at $T_2$ is only slightly higher than the transmittance of the blue pixel at $T_1$. This may be in part because the presence of the vertical electric field generated by applying a voltage to the compensation electrodes 130 causes the liquid crystal directors to be more open (e.g., have a greater tilt) at $T_1$. This raises the transmittance level of the blue pixel to be closer to the maximum transmittance such that the transmittance generally cannot increase much more when temperature increases. Thus, the increase in temperature of the pixel only results in a slight increase in the transmittance of the blue pixel, mitigating the thermal color shift that would otherwise occur.

A plot 288 in FIG. 13B illustrates the driving scheme associated with this embodiment. The plot is defined by a voltage axis (x-axis) and a temperature axis (y-axis). A line 294 represents the driving voltage of the thermally compensated pixel with respect to the temperature of the pixel. As illustrated, the driving voltage remains at a constant voltage ($V_c$) from $T_1$ to $T_2$, and beyond. In this embodiment, the compensation electrodes are always driven at $V_c$ when the display is on regardless of the temperature of the pixel.

Figure 14A:
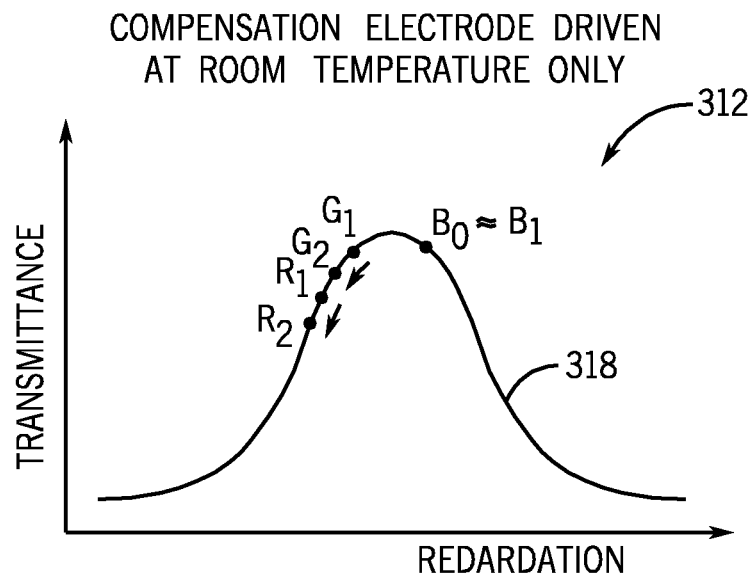
FIGS. 14A and 14B are plots illustrating characteristics of a thermally compensated pixel driven at a first voltage under a temperature threshold and at a second voltage when above the temperature threshold, in accordance with embodiments.
Figure 14B:
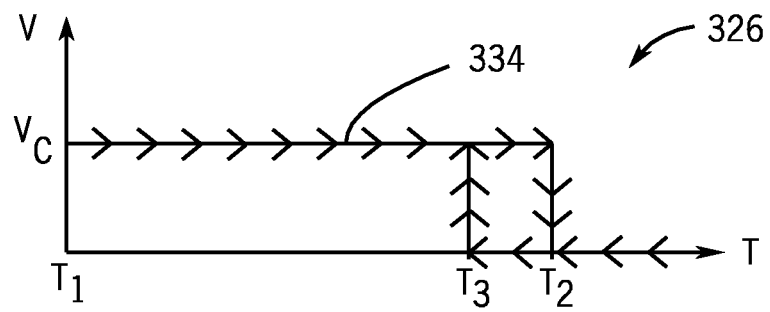

FIGS. 14A-14B illustrate certain behaviors of thermally compensated pixels when the compensation electrodes are driven at a first constant voltage ($V_1$) when the pixel is below a certain temperature threshold, and driven at a second constant voltage ($V_2$) when the pixel is at or above the temperature threshold, in which the second voltage is lower than the first voltage. Specifically, in FIG. 14A, a plot 312 models the transmittance of conventional red and green pixels, and blue thermally compensated pixels, in which there are compensation electrodes. The plot 312 includes an ordinate having a transmittance axis and a retardation axis. A curve 318 defines the relationship between the transmittance and phase retardation. $R_1$ represents a general transmittance level of the red pixel 60R at a first temperature ($T_1$), and $G_1$ represents a general transmittance level of the green pixel 60G at $T_1$. Likewise, $B_1$ represents the transmittance level of the blue pixel 60B at $T_1$. $T_1$ may be close to room temperature or the base operational temperature of the pixel, such as approximately 30° C. $R_2$ represents a general transmittance level of the red pixel 60R at a second temperature ($T_2$), and $G_2$ represents a general transmittance level of the green pixel 250 at $T_2$. $B_2$ represents the transmittance level of the blue pixel 60B at $T_2$, which may be an operational temperature higher than room temperature or the base operational temperature, such as approximately 50° C.

Referring again to FIG. 11, it can be seen that the transmittance of the blue pixel increases near the edges of the pixel. As previously discussed, this may be a result of the boundary effect, in which transmittance becomes greater at the edges of the pixel as temperature rises. Thus, the overall transmittance of the blue pixel increases at temperature increases. However, by driving compensation electrodes 130 at $V_1$ when the pixel is at $T_1$ and driving the compensation electrodes 130 at $V_2$ when the pixel is at $T_2$, the transmittance of the blue pixel may be able to remain substantially consistent from $T_1$ to $T_2$. As such, it can be seen from the plot 312 that the transmittance of the blue pixel at $T_2$ is generally similar to that of the transmittance of the blue pixel at $T_1$. Driving of the compensation electrodes at the $V_1$ when the pixel is at $T_1$ increases the transmittance of the pixel to be similar to the transmittance of the pixel at high temperatures due to the boundary effect. When the compensation electrodes 130 are no longer at $T_1$, the natural increase in transmittance caused by the boundary effect as well as by driving the compensation electrodes 130 at $V_2$ keeps the pixel at a substantially similar transmittance. Thus, by driving the compensation electrodes with $V_1$ at $T_1$ and driving the compensation electrodes with $V_2$ at $T_2$, the transmittance of the blue pixel may remain substantially constant at $T_1$ as well as $T_2$.

To prevent flickering of the compensation electrodes as the temperature oscillates around the threshold temperature, the driving scheme may include appropriate hysteresis characteristics. Plot 326 in FIG. 14B illustrates the driving scheme associated with this embodiment. The plot 326 is defined by a voltage axis as the y-axis and a temperature axis as the x-axis. Specifically, plot 326 includes a curve 334 which represents the driving voltage of the thermally compensated pixel with respect to the temperature of the pixel 60. As illustrated, the driving voltage remains at $V_1$ from $T_1$, which occurs when the pixel 60B is operating, until $T_2$. At and above $T_2$, the driving voltage drops to $V_2$ and the compensation electrodes 130 are driven at a lower voltage. As noted above, the driving scheme of this embodiment contains hysteresis characteristics to prevent rapid switching of the driving voltage if the temperature were to go back and forth between being below $T_2$ and being above $T_2$, which may result in flickering of the pixel 60. As such, the driving scheme is designed such that when the compensation electrodes 130 are driven at $V_2$, the compensation electrodes do not switch to being driven at $V_1$ until the temperature reaches a third temperature ($T_3$), in which $T_3$ is lower than $T_2$ but higher than $T_1$. Generally, the compensation electrodes 130 are always driven at $V_1$ when the pixel is at temperatures below $T_3$, and always driven at $V_2$ when the pixel 60B is at temperatures above $T_2$. Whether or not the compensation electrodes 130 are driven at $V_1$ or $V_2$ when the pixel 60B is in between $T_3$ and $T_2$ depends on the state of the compensation electrodes 130 before entering that range, and generally does not change until the temperature rises or falls out of that range. For example, if the temperature of the pixel rose from a temperature below $T_3$ to a temperature between $T_3$ and $T_2$, the compensation electrodes 130 would remain driven at $V_1$ no matter where the temperature is between $T_3$ and $T_2$. Thus, the compensation electrodes 130 would remain driven until the temperature rises above $T_2$. Likewise, once the temperature of the pixel 60B rises above $T_2$, and the compensation electrodes 130 are driven at $V_2$, the compensation electrodes 130 remain driven at $V_2$ between $T_3$ and $T_2$ until the temperature falls below $T_3$. As it may generally take time for the temperature of pixel 60B to change from being above $T_2$ to below $T_3$, and vice versa, the flickering that may occur without such hysteresis characteristics may be substantially avoided.

Further, in such embodiments, the pixel or thermal electrode correction driver 132 (FIG. 10) may include a temperature sensor and controller configured to sense the temperature of certain pixels and control the compensation electrodes accordingly. Specifically, the sensed temperature may be used to determine whether the compensation electrodes are to be driven at $V_1$ or $V_2$ according to the driving scheme described above.

Figure 15A:
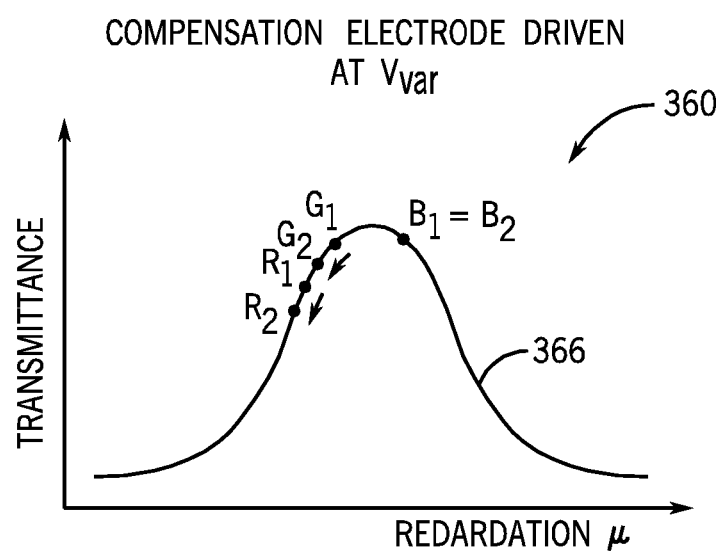
FIGS. 15A and 15B are plots illustrating characteristics of a thermally compensated pixel driven at a variable voltage, in accordance with embodiments.
Figure 15B:
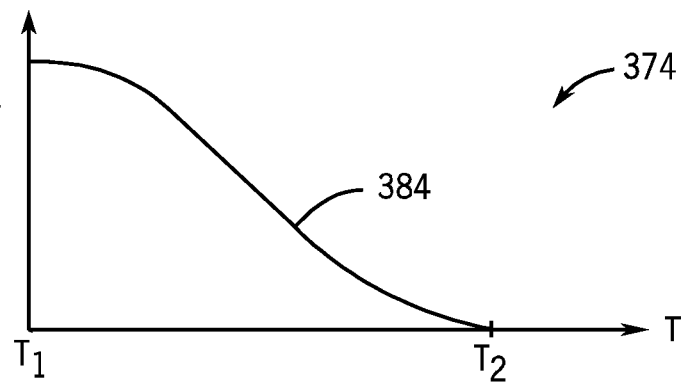

FIGS. 15A-15B illustrate certain behaviors of thermally compensated pixels, in which the compensation electrodes are driven at a variable voltage inversely related to the temperature of the pixel. Specifically, the electric potential difference between the pixel electrode and the compensation electrode decreases as the temperature of the pixel 60 increases. A plot 360 in FIG. 15A models the transmittance of conventional red and green pixels 60R and 60G, and blue thermally compensated pixels, in which there are compensation electrodes 130. The plot 360 includes an ordinate having a transmittance axis and a retardation axis. The A curve 366 defines the relationship between the transmittance and phase retardation. In the plot, $R_1$ represents a general transmittance level of the red pixel 60R at a first temperature ($T_1$), and $G_1$ represents a general transmittance level of the green pixel 60G at $T_1$. Likewise, $B_1$ represents the transmittance level of the blue pixel 60B at $T_1$. $T_1$ may be close to room temperature or the base operational temperature of the pixel, such as approximately 30 degrees Celsius. $R_2$ represents a general transmittance level of the red pixel 60R at a second temperature ($T_2$), and $G_2$ represents a general transmittance level of the green pixel 250 at $T_2$. $B_2$ represents the transmittance level of the blue pixel 60B at $T_2$, which may be an operational temperature higher than room temperature or the base operational temperature, such as approximately 50 degrees Celsius. It can be seen from the plot 360 that the transmittance of the blue pixel at the second temperature is generally similar to that of the transmittance of the blue pixel at the first temperature.

A plot 374 in FIG. 15B illustrates the driving scheme associated with this embodiment. The plot 374 is defined by a voltage axis and a temperature axis. A curve 384 represents the driving voltage of the thermally compensated pixel with respect to the temperature of the pixel. As illustrated, the driving voltage decreases as temperature increases. It should be noted that the plot 374 is a symbolic representation of one possible relationship between driving voltage and temperature. As interactions between the pixel electrode 110, the compensation electrode 130, and the common electrode 130 may differ in different embodiments, the exact curve of the plot 374 may be unique to each embodiment and more complex than what is illustrated. Generally, the transmittance of a conventional blue pixel increases as temperature increases, causing a color shift. Driving the compensation electrodes at a relatively high voltage when the pixel is at a low temperature, such as $T_1$, raises the transmittance of the pixel. However, as the transmittance of the pixel increases naturally due to increase in temperature, the compensation electrodes are driving at a lower voltage as a lower voltage is required to bring the transmittance of the pixel to the same level as when the pixel was at the lower temperature. In other words, the hotter the pixel, the less driving voltage is needed to bring the transmittance to the same level. Thus, the driving voltage may be configured to decrease as the temperature increases, and increase as the temperature decreases. This enables the pixel to remain at substantially the same transmittance level over the operational temperature range.

Further, in such embodiments, the pixel or thermal electrode correction driver 132 (FIG. 10) may also include a temperature sensor and controller configured to sense the temperature of certain pixels and control the driving voltage of the compensation electrodes accordingly. Specifically, the sensed temperature may be used to determine the driving voltage of the compensation electrodes according to the driving scheme described above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display, comprising:
an array of pixels, wherein at least one pixel in the array of pixels is a thermally compensated pixel, the thermally compensated pixel comprising:
a liquid crystal layer having a first side and a second side, wherein the first side is opposite of the second side;
a pixel electrode disposed on the first side of the liquid crystal layer; a common electrode disposed on the first side of the liquid crystal layer; and
at least one compensation electrode disposed on the second side of the liquid crystal layer.

2. The display of claim 1, comprising:
a black mask delineating at least one edge of the thermally compensated pixel in the array of pixel; and
a color filter disposed between the liquid crystal layer and the black mask.

3. The display of claim 1, wherein the at least one compensation electrode is configured to be driven with a voltage during operation of the display.

4. The display of claim 3, wherein the at least one compensation electrode is configured to be driven at a constant voltage during operation of the display.

5. The display of claim 3, wherein the at least one compensation electrode is configured to be:
driven with a first voltage when the temperature of the display is lower than a first temperature; and
driven at a second voltage when the temperature of the display is higher than a second temperature, wherein the second temperature is higher than the first temperature.

6. The display of claim 3, wherein the at least one compensation electrode is driven by a variable voltage, wherein the voltage is related to the temperature of the display.

7. The display of claim 1, wherein the thermally compensated pixel comprises a first compensation electrode and a second compensation electrode, wherein the first compensation electrode is disposed generally along a first edge of the thermally compensated pixel and the second compensation electrode is disposed generally along a second edge of the thermally compensated pixel.

8. The display of claim 7, wherein the first and second compensation electrodes are configured to be driven by a voltage, wherein the voltage induces a vertical electric field in the liquid crystal layer, between the first compensation electrode and the pixel electrode and between the second compensation electrode and the pixel electrode.

9. The display of claim 1, wherein the array of pixels includes a red pixel, a green pixel, and a blue pixel, wherein the blue pixel comprises the thermally compensated pixel.

10. An electronic device comprising:
data processing circuitry configured to generate image data signals; and
an electronic display configured to display the image data signals on an array of pixels, the array of pixels comprising at least one thermally compensated pixel, the thermally compensated pixel comprising:
a liquid crystal layer having a first side and a second side, wherein the first side is opposite of the second side;
a pixel electrode disposed on the first side of the liquid crystal layer; a common electrode disposed on the first side of the liquid crystal layer; and
at least one compensation electrode disposed on the second side of the liquid crystal layer.

11. The electronic device of claim 10, comprising an interface configured to receive an operator input and send an input signal to the data processing circuitry based on the operator input.

12. The electronic device of claim 11, comprising a touch screen portion of the display.

13. The electronic display of claim 10, wherein the at least one compensation electrode is configured to be driven at a voltage during operation of the display.

14. The electronic device of claim 10, wherein the at least one compensation electrode is configured to be:
driven at a first voltage when the temperature of the display is lower than a first temperature; and
driven at a second voltage when the temperature of the display is higher than a second temperature, wherein the second temperature is higher than the first temperature.

15. The electronic device of claim 10, wherein the at least one compensation electrode is driven by a variable voltage, wherein the voltage is related to the temperature of the display.

16. The display of claim 10, wherein the array of pixels includes a red pixel, a green pixel, and a blue pixel, wherein the blue pixel comprises the thermally compensated pixel.

17. A method of correcting a thermal color shift, comprising:
providing a voltage to a plurality of compensation electrodes in respective thermally compensated pixels of an LCD display to compensate for changes in transmittance of the thermally compensated pixels due to temperature variations.

18. The method of claim 17, wherein the step of providing a voltage further comprises:
generating a vertical electric field in the thermally compensated pixels for the compensation.

19. The method of claim 17, wherein the LCD display comprises a plurality of red pixels, a plurality of green pixels, and a plurality blue pixel, wherein at least one of the plurality of blue pixel comprises at least one of the thermally compensated pixels.

20. The method of claim 17, comprising:
providing a constant voltage to the plurality of compensation electrodes during operation of the LCD display.

21. The method of claim 17, comprising:
providing a voltage to the plurality compensation electrodes if the temperature of the LCD display is lower than a first temperature; and
providing a second voltage to the plurality of compensation electrodes if the temperature of the LCD display is higher than a second temperature, wherein the second temperature is higher than the first temperature.

22. The method of claim 17, comprising:
providing a variable voltage to the at least one compensation electrode, wherein the voltage value is inversely related to the temperature of the LCD display.

23. A method of manufacturing a display, comprising:
forming a thin film transistor layer on a lower substrate, wherein the thin film transistor layer comprises a common electrode and a pixel electrode;
disposing a liquid crystal layer on the thin film transistor layer; and
disposing at least one compensation electrode on a side of the liquid crystal layer opposite the thin film transistor layer, wherein the pixel electrode, the at least one compensation electrode, and a portion of the thin film transistor layer and liquid crystal layer correspond to a thermally compensated pixel in an array of pixels.

24. The method of claim 23, comprising:
disposing two compensation electrodes at opposite edges of the thermally compensated pixel.

25. The method of claim 23, comprising:
disposing a black mask on the liquid crystal layer opposite the thin film transistor layer, wherein the black mask further delineates edges of the thermally compensated pixel.

26. A method of manufacturing an electronic device, comprising:
coupling a processing circuit to a display; and
disposing the processing circuit and the display in a housing, wherein the display is made by:
forming a thin film transistor layer on a lower substrate, wherein the thin film transistor layer comprises a common electrode and a pixel electrode;
disposing a liquid crystal layer on the thin film transistor layer; and
disposing at least one compensation electrode on a side of the liquid crystal layer opposite the thin film transistor layer, wherein the pixel electrode, the at least one compensation electrode, and a portion of the thin film transistor layer and liquid crystal layer correspond to a thermally compensated pixel in an array of pixels.

27. The method of manufacturing an electronic device of claim 26, wherein the display is made by:
disposing two compensation electrodes at opposite edges of the thermally compensated pixel.

28. The method of manufacturing an electronic device of claim 26, comprising:
assembling the housing, processing circuitry, and the display, or a subset thereof.

* * * * *